United States Patent [19]

Moss et al.

[11] Patent Number: 5,035,474

[45] Date of Patent: Jul. 30, 1991

[54] BIOCULAR HOLOGRAPHIC HELMET MOUNTED DISPLAY

[75] Inventors: Gaylord E. Moss, Marina Del Rey; Brian D. Cohn, El Segundo; Mao-Jin J. Chern, Rancho Palos Verdes; Lacy G. Cook, Hawthorne; John J. Ferrer, Los Angeles, all of Calif.

[73] Assignee: Hughes Aircraft Company, Los Angeles, Calif.

[21] Appl. No.: 563,897

[22] Filed: Aug. 1, 1990

Related U.S. Application Data

[63] Continuation of Ser. No. 319,914, Feb. 22, 1989, abandoned, which is a continuation of Ser. No. 600,636, Apr. 16, 1984, abandoned.

[51] Int. Cl.⁵ .................. G02B 5/32; G02B 27/10
[52] U.S. Cl. ...................... 350/3.7; 350/3.72; 350/174
[58] Field of Search ............... 350/3.7, 3.72, 174

[56] References Cited

U.S. PATENT DOCUMENTS

| | | | |
|---|---|---|---|
| 3,059,519 | 10/1962 | Stanton | 88/1 |
| 3,807,829 | 4/1974 | Close | 350/174 |
| 3,940,204 | 2/1976 | Withrington | 350/3.72 |
| 4,001,499 | 1/1977 | Dowell | 358/93 |
| 4,048,653 | 9/1977 | Spooner | 7/18 |
| 4,218,111 | 8/1980 | Withrington et al. | 350/3.72 |
| 4,447,128 | 5/1984 | Ferrer | 350/174 |
| 4,457,579 | 7/1984 | Thylén | 350/3.72 |

FOREIGN PATENT DOCUMENTS

| | | |
|---|---|---|
| 2006463 | 5/1979 | United Kingdom . |
| 1581926 | 12/1980 | United Kingdom . |
| 1602373 | 11/1981 | United Kingdom . |
| 2100466 | 12/1982 | United Kingdom . |

OTHER PUBLICATIONS

Hughes Aircraft Co., "Superimposed Images Enhanced Night Vision", *Machine Design*, vol. 52, No. 18, Aug. 7, 1980, p. 36.
Published Unexamined Japanese Patent Application No. 54-70850, corresponding to U.S. Application Ser. No. 842,641, filed Oct. 17, 1977, Gaylord E. Moss et al.

*Primary Examiner*—Jon W. Henry
*Attorney, Agent, or Firm*—Leonard A. Alkov; Wanda K. Denson-Low

[57] ABSTRACT

A helmet mounted display uses a see-through visor holographic combiner to provide, in the normal field of view of a helicopter pilot, a pair of images derived from an image source such as a miniature cathode ray tube. A source of the video display may be an infrared sensor mounted on an external turret underneath the helicopter. The turret rotates in response to helmet movements so that the pilot is continually provided with a dual image from the CRT display which corresponds with the external scene as visible through the visor.

18 Claims, 4 Drawing Sheets

BIOCULAR HOLOGRAPHIC HELMET MOUNTED DISPLAY

This is a continuation of application Ser. No. 07/319,914 filed Feb. 22, 1989 and now abandoned, which is a continuation of application Ser. No. 600,636, filed Apr. 16, 1989, now abandoned.

BACKGROUND OF THE INVENTION

1. Field of the Invention

This invention relates to systems for enhancing the capability of a pilot to successfully operate an aircraft such as an attack helicopter in a low light level environment and, more particularly, to systems providing helmet mounted displays which combine infrared or other image detection and instrumentation symbology in a biocular helmet mounted display.

2. Description of the Prior Art

Various systems are known in the prior art which have been developed to display symbology information or reticle information to an eyepiece for viewing by a pilot. Images from sensors such as radar, forward looking infrared (FLIR), low-light-level television imagery, electroptical sensors and the like are combined with such information and presented to the pilot eyepiece. A number of such systems are described in an article entitled "Helmet-Mounted Display Interest Revives", Aviation Week & Space Technology, Feb. 24, 1969. Some of these systems rely on binocular type arrangements with image intensifiers for amplifying the light level in the scene viewed by the pilot. Such systems suffer from the disadvantage that the field of view presented to both eyes may not be the same, the image intensifier arrangement is cumbersome and heavy, and the eyepiece(s) constitute an object in front of the pilot's face which is likely to cause injury in the event of impact.

Other systems described in the article incorporate one or a pair of cathode ray tubes which generate images projected through optics for viewing by the pilot. The cathode ray tubes are mounted along the sides of the helmets and may provide the pilot with only a monocular view. In some of these versions, the pilot is required to view the display with one eye through an eyepiece equipped with a rubber cup to shut out ambient light. Variations in light intensity in the scenes presented to the pilot's eyes tend to produce eyestrain and the rubber cup becomes uncomfortable, possibly inducing headaches, in extended use. Furthermore, the viewing of separate images by the two eyes requires substantial training for a pilot to adapt to such an image presentation and tends to be tiring and confusing. Potential confusion or rivalry between displayed information and external background is to be avoided, if possible. The use of partially reflecting mirrors to display the images in front of the pilot's eyes undesirably cuts down on the available light for the outside scene which the pilot views directly. Also the distribution of components of a helmet mounted display is an important consideration, since the moments of inertia with respect to the wearer's spine should be minimized in order to avoid wearer discomfort and fatigue.

A system called "Nighthelm" of Marconi Avionics Limited has been developed for use in modern attack helicopters which employ a steerable FLIR sensor to provide night flying imagery together with target sensing capability. The pilot can view the aircraft instruments and the real world through a pair of eyepieces on which are also projected images developed from a pair of image intensifiers situated along the helmet above the eyepiece. By switching to another mode, the pilot may view on one eyepiece an image derived from a cathode ray tube (CRT) which displays FLIR imagery from the remote steerable sensor system. This system does not present images from the CRT to both eyes and thus, in the CRT viewing mode, presents different images to the pilot's eyes. Furthermore, the eyepieces are of heavy thick plastic, and they and the binocular/image intensifier portion of the system present a risk of injury to the pilot upon impact. A further disadvantage of a binocular system is the requirement that the binoculars be adjustable to accommodate the interpupillary dimensions for various users. Thus this system is also subject to many of the problems and disadvantages discussed above.

Withrington U.S. Pat. No. 3,940,204 discloses the use of holograms in head-up and in helmet mounted displays. The holographic lens of those displays is particularly constructed to correct particular optical aberrations and further compensation is afforded by the use of a relay lens having cylindrical surfaces. The image presented at the visor is monocular.

SUMMARY OF THE INVENTION

In brief, particular arrangements in accordance with the present invention incorporate an improved type of helmet mounted display which allows the wearer to look through a clear visor and see a virtual image at infinity of a display generated on an object source such as a miniature cathode ray tube (CRT). The invention combines a number of optical elements with the helmet visor as an image display means to achieve a superior display system. The light display which is to be imaged to the viewer is developed by an object source, which may be for example a CRT, a liquid crystal display, fiber optics or the like. In one particular application of the invention, this object source develops a display which combines the signals from the FLIR sensor mounted in a turret beneath the helicopter with symbology derived from the helicopter instrumentation. The FLIR turret is steerable through a head-tracking control system tied to the helmet.

Next to the object source is an image folding device which may be a prism or a mirror. This is provided for packing purposes, enabling the system to be more compact, and also serves to provide aberration correction.

Following the image folder in the optical path is a relay lens which is used to image the source onto the eyepiece focal surface. This relay lens is preferably a Cooke triplet or a modified triplet. It may incorporate aspheric surfaces on some of the lens elements, but such is not essential. It may be tilted and decentered if desired to accommodate the intended light path and to correct aberrations. The aperture stop may be above, below or within the lens.

Adjacent the exit side of the relay lens is a beam splitting element which serves to divide the light beam out of the relay lens into two beams so that biocular images will be projected for each eye. Preferably in the present invention, the splitting element may be an X-cube prism, but it may also comprise a roof prism or known mirror beam splitters. The X-cube prism is a known element having internal reflective/transmissive surfaces which reflect two light beams laterally in opposite directions from a single incident light beam.

Beam folders in the form of wing mirrors (which may have optical power, if desired) are laterally displaced from the splitting element in order to reflect the transverse beams out of the splitter toward the visor eyepieces.

The eyepieces which form the respective biocular images are preferably in the form of embedded holograms laminated to the surface of a molded integral visor. As an alternative, partially silvered mirrors or CVD gratings might be employed, but the holographic elements are preferred. These serve to collimate the light in order to present a virtual image (for the viewer) at infinity. The two biocular images present a total field-of-view overlap so that both eyes view the same image. In addition, by virtue of the transparent nature of the holographic elements, the visor serves as a combiner whereby the pilot sees not only the displayed images from the object source but also the outside scene in the direction in which he is looking. Because of the one piece, integrated nature of the visor, it is capable of serving in conventional fashion as a protective visor for the helmet wearer, in addition to its function as the display element in the overall display system.

In preferred arrangements in accordance with the invention, the biocular display system includes a particular three-element relay lens configuration employing aspheric surfaces and a cube beam splitter to generate a pair of real images of the miniature head-mounted CRT display. A folding prism is located in the optical path adjacent to the CRT to achieve a suitable positioning of the CRT in the system configuration which minimizes the moment of inertia of the respective display components. This enables the CRT to be mounted close to the helmet and following the profile of the user's head. The visor is an integrated part of the display and provides protection to the user's eyes. It accommodates most of the population of potential users without need for lateral adjustment and offers no visual obscuration to the wearer. The visor is also spaced from the user's face sufficiently to accommodate a pair of glasses worn by the user.

Two reflective holographic elements serving as eyepieces are located on the protective visor and transform the real CRT images from the beam splitter into a pair of identical virtual images at infinite distance which are then viewed by both eyes. Because the holograms are almost transparent, the displayed imagery appears superimposed on the outside scene. The helmet visor display of the present invention provides a field of view which is 30° in elevation by 40° in azimuth with full overlap between the two image fields displayed on the visor, hence, both eyes view the same image. The visor holographic elements form combiners which introduce a bend angle in the rays from the CRT so that the optical path runs parallel to the forehead and as close to the head as is feasible, considering the space needed for padding inside the helmet. Since the visor holographic elements serve as eyepieces and form combiners, those elements are hereinafter sometimes referred to as eyepieces and othertimes as combiners.

In one particular embodiment, this configuration results in a 58° bend angle at the visor and a depression of the vertical field by 5° relative to the user horizontal. This depression is acceptable for attack helicopter use, since in field operation most targets are below the helicopter. After the CRT light is divided in the cube beam splitter, the resulting two beams are reflected by laterally disposed wing mirrors and then directed to the visor holographic elements. The display field of view is closely matched to the normal horizontal field of view. The optical system develops an exit pupil which is 15 mm. wide by 10 mm. high, located 90 mm. from the combiner. The centers of the left and right exit pupils are 62.5 mm. apart. The exit pupil size is large enough to accommodate the interpupillary separations of 90% of the population; that is, the separations of the fifth through the ninety-fifth percentiles of the population. Thus the need for providing adjustability of the viewing elements is eliminated and the goal of an integrated molded visor affording maximum protection of the wearer against the effects of object impact is achieved.

The selection and arrangement of optical elements of the system serve to compensate for inherent aberrations in certain components. Specifically, the tilt of the relay lens assembly and the wedge in the folding prism correct for the axial coma which is introduced by the off axis holographic eyepiece elements. It is desirable that all elements of the relay lens have a common axis in order to minimize the alignment complexity of the relay lens.

In one preferred embodiment of the invention, the relay lens is essentially a variant of a Cooke triplet with aspheric surfaces. In a production environment, wherein the lens elements are formed of injection molded plastic, the aspheric surfaces are readily fabricated and this allows the relay lens (such as a Cooke triplet) to have fewer elements than comparable prior art systems. The relay lens may incorporate a spectral filter where needed in order to eliminate spurious blue and red images developing from spikes in certain CRT phosphors.

The preferred embodiment utilizes a ¾-inch CRT display utilizing a P-43 phosphor having a spectral peak at 543 nanometers, the same wavelength to which the holograms are tuned. The folding prism is constructed so that the CRT centerline points to the left and slightly forward while lying in a plane that is largely horizontal. This configuration was chosen in order to simplify the design for the housing of the CRT. The relay lens, following the folding prism, comprises three elements (plus the spectral filter) all having a common axis. Where a filter is not necessary, it may be replaced by a clear piece of glass.

The relay lens is followed by an X-cube prism, which is a set of four right-angled prisms joined in a cube to split the light which forms two images from the incident CRT source. These are then reflected by associated laterally disposed wing mirrors to direct the images to the holographic elements in the visor. These in turn reflect the images through the bend angle at the visor, collimate the beams and direct the images to the pilot's eyes with the specified exit pupil.

Thus, helmet mounted display systems in accordance with the present invention present substantial improvements over helmet mounted displays which are known in the prior art. The hologram elements on the visor are virtually transparent and present no visual obscuration of the field of view. There is true biocular display of the images to both eyes from a single light source, with complete overlap of the two images. Rather than being a potential hazard to the wearer in the event of impact, as with the binocular or FLIR systems which mount heavy lenses, framework, etc., in front of the eyes, the integrated visor of the present system which is molded in one piece of tough lightweight plastic can withstand substantial impact forces and provides eye protection.

The display system is extremely compact and lightweight, and the heavier components of the system are mounted symmetrically close to the wearer's head, thereby minimizing both the weight and the inertial moment of the overall display which is added to the helmet.

The holograms utilized in the present invention are developed in thin gelatin layers which are laminated on the integrated molded visor. The holograms are virtually transparent, thus developing a high see-through capability, and also provide a high reflection efficiency for the CRT images by virtue of the coordination of their wavelength characteristics to the particular properties of the CRT phosphor.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
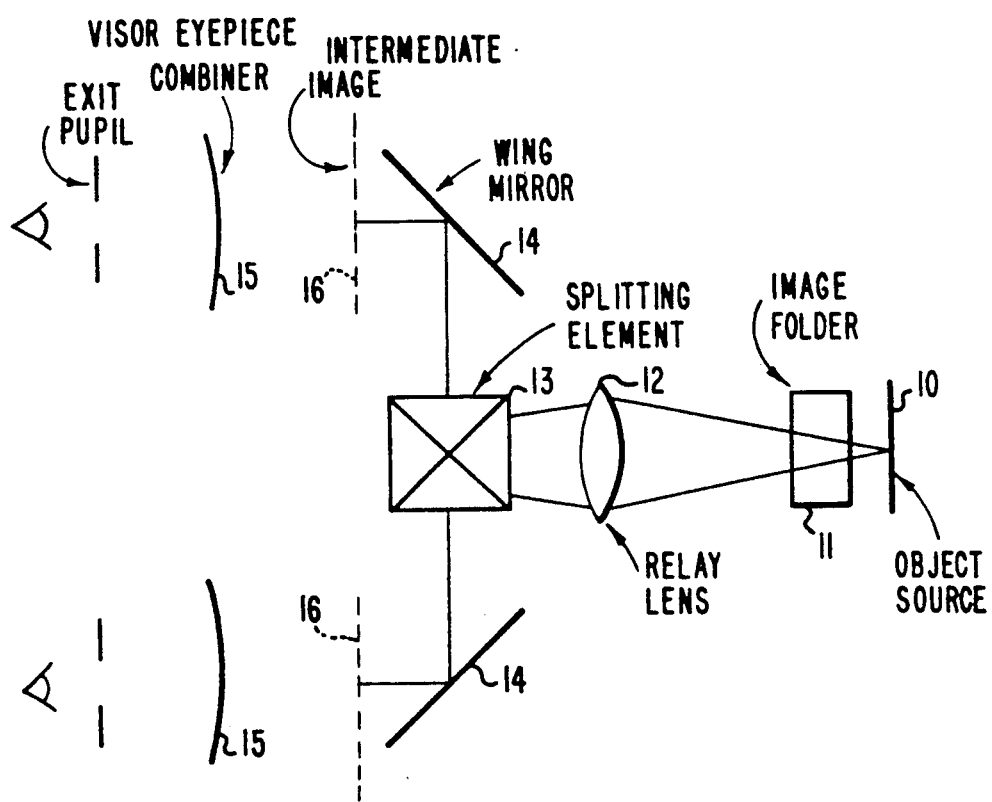
FIG. 1 is a block diagram illustrating the various elements of the display system of the present invention and the light paths therein.

The general arrangement of the present invention is illustrated schematically in the block diagram of FIG. 1. In this figure, light is shown emanating from an object source 10, which may be a CRT, and directed by an image folder 11 via a relay lens 12 to a splitting element 13. (The beam path from the source to the image folder is shown unfolded in the drawings for convenience of illustration.) The incident light is then split into two beams by the splitting element 13 which directs the beams laterally to a pair of folding members, shown in the form of wing mirrors 14 which redirect the two beams toward respective eyepieces, shown as the holographic elements of the visor 15, which collimate the light, redirect the beams toward the user's eyes, and form the exit pupil indicated. Each eye views the image at the corresponding exit pupil as a virtual image at infinity. The intermediate images, represented by the broken lines 16, are developed between the relay lens 12 and the visor 15.

Figure 2:
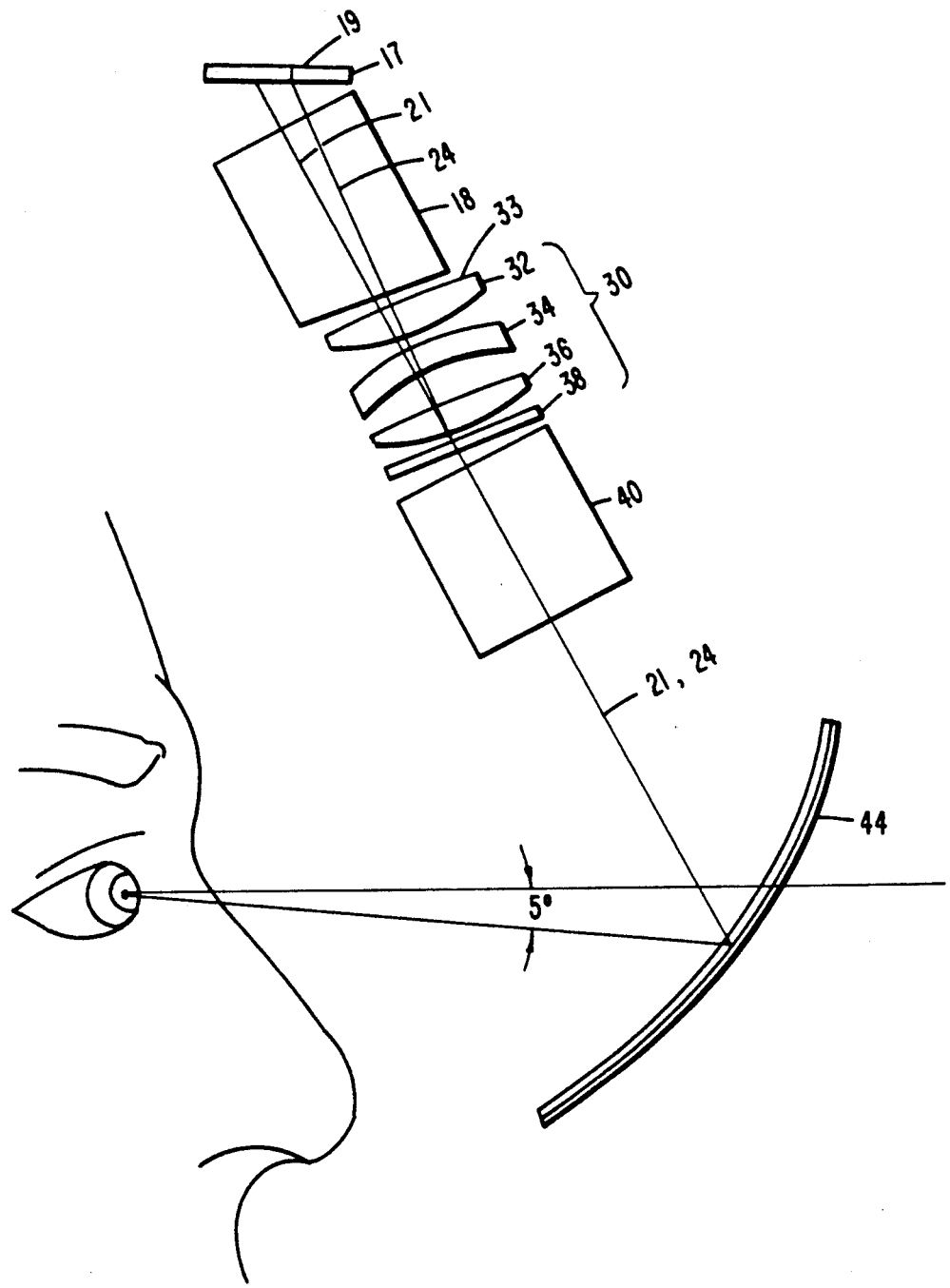
FIG. 2 is a schematic diagram of one particular arrangement of the present invention, showing the relation of the helmet mounted display to the user's head.
Figure 3:
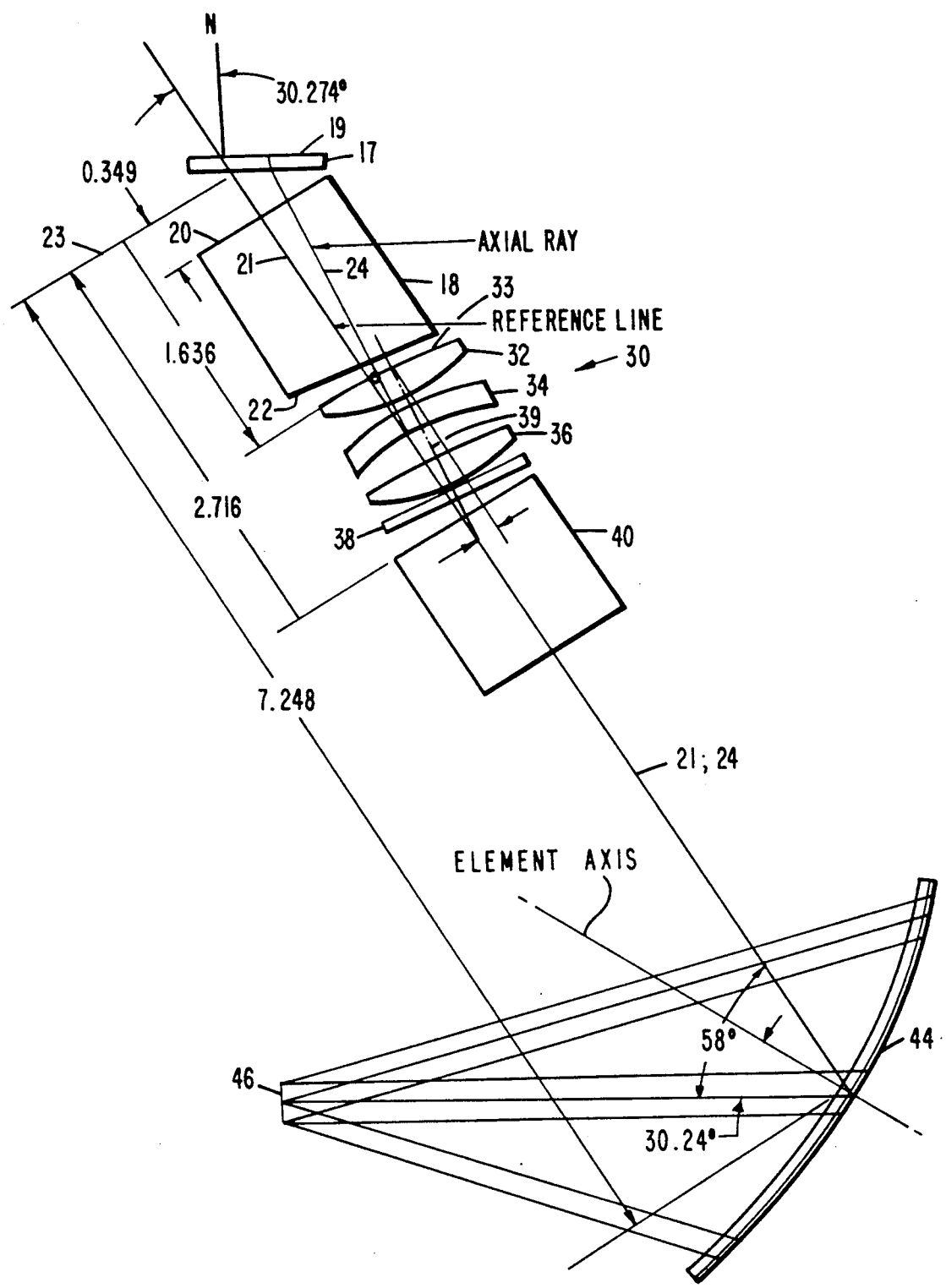
FIG. 3 is a schematic diagram illustrating various details of the elements making up the arrangement of FIG. 2.
Figure 4:
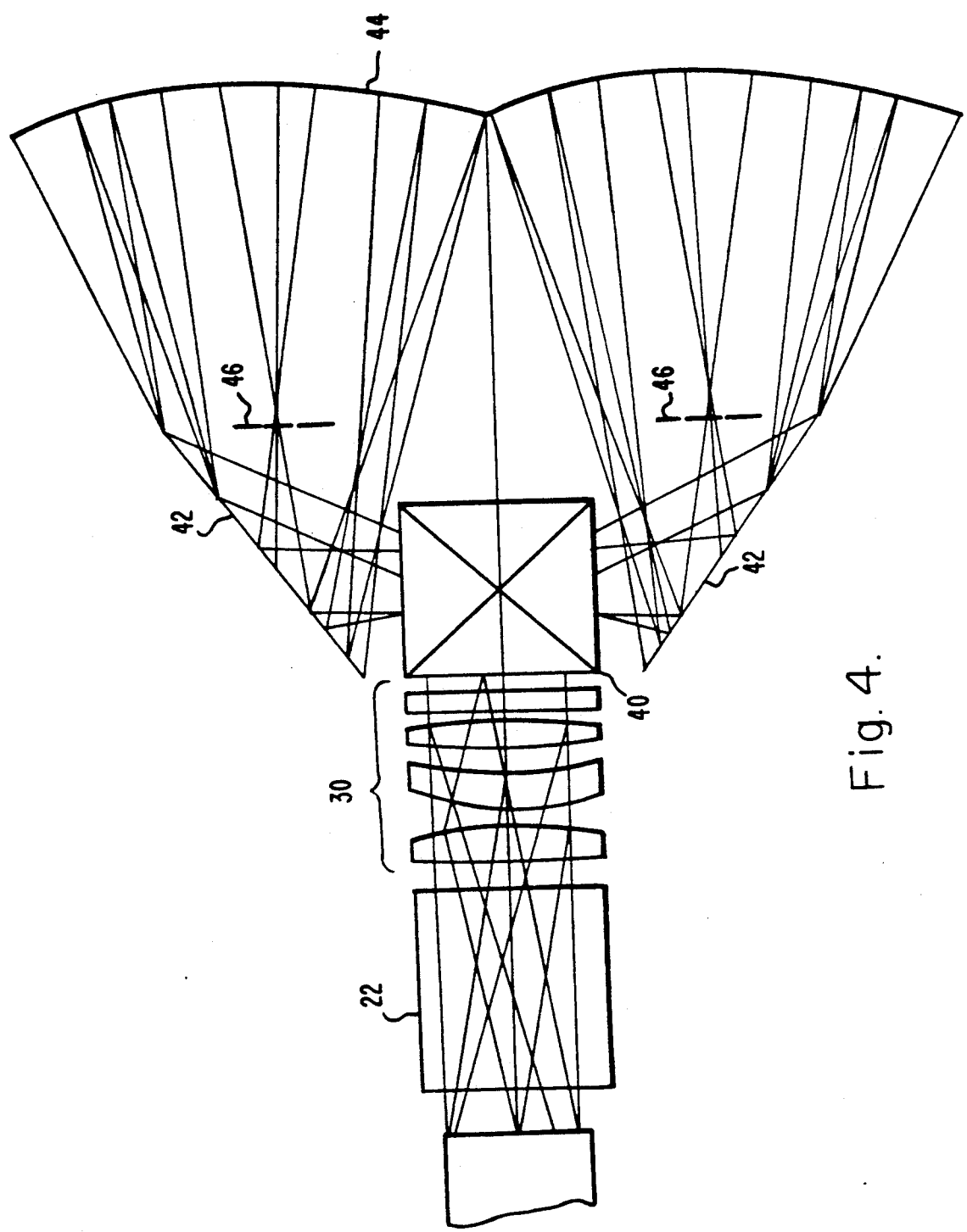
FIG. 4 is an orthogonal view of the arrangement of FIG. 3, showing the biocular use of the display.

The preferred embodiment is represented schematically in further detail in FIGS. 2-4. The arrangement of the principal elements of the biocular system of the invention is shown in FIG. 2 in relation to the wearer's head (the helmet has been omitted for simplicity). The biocular display system is shown comprising a miniature cathode ray tube having a flat plate display element 17 bearing a phosphor on its inner surface 19. A fiber optic face plate, flat or curved as desired, might be used instead. As indicated in FIG. 3, the normal to the CRT plate 17 is aligned at 30.274° to the reference line 21 of the system.

Next to the CRT plate 17 is a folding prism 18. The entrance face 20 of the prism 18 is orthogonal to the reference line 21 (and thus at 30.274° to the plane of the CRT plate 17) while the exit face 22 is at a wedge angle of 8.36°. The light from the cathode ray tube is internally reflected within the prism 18 which is spaced so that the entrance face 20 is located at a point 0.349 inch from a zero reference line 23, which is orthogonal to the reference line 21 at the outer surface of the CRT face plate 17.

Next to the folding prism 18 is the relay lens 30 comprising three lenses 32, 34 and 36 in a modified Cooke triplet, together with a spectral filter 38. The two outer lenses 32 and 36 of the triplet have aspheric surfaces while the intermediate lens 34 is a meniscus lens with spherical surfaces. The mounting of the relay lens off-axis serves to bend the axial ray 24 into coincidence with the reference line 21. The light transmitted by the relay lens 30 is then directed to an X-cube prism 40, better shown in FIG. 4, where it is split into a pair of laterally directed images which are reflected by wing mirrors 42 on opposite sides of the X-cube prism 40 and sent to the visor/eyepiece/combiner 44. Rays from a particular field point are collimated by the combiner 44 and an exit pupil is formed at 46 (represented by the broken lines 46 in FIG. 4).

The view in FIG. 4 is taken from the upper right of FIG. 2, parallel to the reference line 21 and the aligned faces of the folding prism 18 and X-cube prism 40. For simplicity, the wing mirrors 42 are not shown in the views of FIGS. 2 and 3.

As indicated in FIG. 3, the aspheric lens 32 is mounted such that the point at which its upper surface 33 is intersected by the axial ray 24 is located 1.636 inches from the zero reference line 23. The upper face of the X-cube prism 40 is 2.716 inches from the zero reference line 23, while the point at which the reflected axial ray 24 exits the combiner 44 is positioned 7.248 inches from the zero reference line 23. The combiner 44 is oriented such that its element axis in the plane of FIG. 3 forms an angle of 30.24° with the path of the axial ray exiting the combiner 44 (extending in the direction of the exit pupil 46).

The location of the wing mirrors 42 relative to the combiner 44 is limited by a requirement for a 35° see-through look-up capability and necessary head clearance (see FIG. 2). This in turn fixes the location of the X-cube prism 40. First order and packaging considerations (especially the need for a long back focus to allow the inclusion of the fold prism 22) dictate that the aperture stop (of which the exit pupil 46 is an image) fall slightly above the X-cube prism 40. This is also one of the positions of the aperture stop for which the relay lens 30 can most readily be designed for superior performance. However, with minor modification of the design, the stop may be located above or within the relay lens 30, if desired. Sufficient eye relief has been incorporated into the display system to allow the user to wear glasses and a standard oxygen mask. Given the eye relief and aperture stop location desired, the focal length of the combiner 44 and the magnification of the relay lens 30 are readily determinable. Because the user looks through the visor 44, see-through distortion is carefully controlled. Also, particular care has been taken in the design of the preferred embodiment to insure that there is minimal see-through variation when crossing the border of the combiner 44.

The axis of the relay lens 30 comprising the elements 32, 34, 36 and 38 (represented by the dot-dash line 39) is at an angle of 5.29° to the reference axis 21; and the point at which the axis 39 intersects the surface 33 of the lens 23 is displaced from the reference line 21 by 0.129 inch.

A summary of the optical characteristics of the particular embodiment of the present invention depicted in FIGS. 2-4 is set forth in the following Table I:

TABLE I

| Parameter | Value |
| --- | --- |
| System | |
| Horizontal field of view | 40° |
| Vertical field of view | 30° |
| Exit pupil width | 15 mm. |
| Exit pupil height | 10 mm. |
| Effective focal length | 26.7 mm. |
| Horizontal f-number | 1.77 |
| Vertical f-number | 2.70 |
| CRT diameter | 19.0 mm. |
| Exit pupil separation | 62.5 mm. |
| Wavelength | 543.0 nm. |
| Internal | |
| Combiner focal length | 50.8 mm. |
| Combiner f-number | 3.4 |
| Combiner bend angle | 58° |
| Relay lens f-number | 1.1 |
| Relay lens field of view | 30° |
| Approximate relay lens width | 26 mm. |

A layout similar to that shown in FIG. 3 is appropriate if a fiber face plate CRT is substituted for the glass face plate 17 which is shown. In such a case, however, the spacing and alignment of the elements 18, 32, 34, 36, 38 and 40 would be adjusted slightly to account for the fact that the image is developed at the outer face of the CRT instead of the inner surface 19 as indicated in FIG. 3.

It will be apparent to those skilled in the art that the various parameters set forth hereinabove with respect to the particular embodiment depicted in FIGS. 2-4 are selected in accordance with acceptable design principles. Other parameters of the system, not specified, such as the prescriptions for the lens surfaces of the elements in the relay lens 30, may be chosen in accordance with such principles. These principles are well known to those skilled in the art and may be found in any good textbook on optical engineering. One such text is "Modern Optical Engineering" by Warren J. Smith (McGraw-Hill, Inc. 1966).

There has thus been shown and described hereinabove an improved type of helmet mounted display which allows the wearer to look through a clear visor and see a virtual image at infinity of a display generated on a miniature CRT. This is of particular utility where movement of the helmet is used to control the direction of a FLIR sensor turret from which the portion of the CRT image representing the external scene is derived. All of the elements making up the display system, with the sole exception of the combiner which constitutes the helmet visor, are mounted on the helmet out of the field of view and away from any position where they might cause injury to the user. The present display, particularly the helmet visor, is compatible with on board life support systems, such as the pilot's spectacles, oxygen mask, etc. The incorporation of the X-cube splitter in combination with the integrated visor achieves added protection against impact for the pilot with improved compactness, reduction in weight, and minimal moment of inertia of the helmet mounted display. As compared with known prior art systems, the biocular system of the present invention establishes a larger field of view, a larger exit pupil, improved resolution, a complete biocular scene overlap to each eye and a normal viewing field. Moreover, the display system develops easy adaptability of the user with a minimum of instruction and training being required. The result is an enhancement of the safety and effectiveness of operation of helicopters or other aircraft in which such a system may be installed.

Although there have been described above specific arrangements of a biocular holographic helmet mounted display in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Biocular display apparatus for mounting on a helmet to provide biocular images from a single object source combined with external scenes received through a helmet visor comprising:

an object source device to be mounted adjacent the helmet for providing a downwardly directed display along the forward portion of the helmet;

an X-cube prism for splitting incident light from the object source device into a pair of oppositely directed traverse beams, said X-cube prism having internal surfaces which are partially reflective and partially transmissive to develop the transverse beams from incident light at one external face of the prism;

a substantially transparent visor for mounting on said helmet and having dual eyepieces oriented at a selected angle, said eyepieces being substantially transparent to permit the helmet wearer to view external scenes therethrough and comprising diffraction optical means for diffracting light directed thereto from the object source device to project collimated biocular images at respective exit pupils in the vicinity of the helmet wearer's eyes;

means between the object source device and the X-cube prism for directing light from the object source to the X-cube prism; and fold means adjacent the X-cube prism for directing the two light beams from the X-cube prism toward the respective eyepieces, and wherein said object source device, said X-cube prism, said light directing means and said fold means are arranged above the helmet wearer's eyes and generally in the region of the wearer's forehead such that each light ray incident on an eyepiece from the object source device and the corresponding light ray diffracted from the eyepiece toward the corresponding exit pupil define a generally vertical plane.

2. Apparatus of claim 1 wherein the means between the object source device and the X-cube prism comprise an image folding element and a relay lens mounted in succession along the light path between the object source device and the X-cube prism.

3. Apparatus of claim 2 wherein the image folding means comprise a prism having an exit face oriented at a preselected wedge angle selected to provide aberration correction of the light beam.

4. Apparatus of claim 2 wherein the relay lens comprises a triplet of individual lenses separately spaced from each other.

5. Apparatus of claim 4 wherein the triplet of lenses comprises first and third lenses having aspheric surfaces and an intermediate meniscus lens having spherical surfaces.

6. Apparatus of claim 5 wherein the relay lens further includes a filter for eliminating unwanted colors from the object source device display.

7. Apparatus of claim 2 wherein the X-cube prism is substantially centrally oriented relative to the axial ray of incident light projected from the relay lens.

8. Apparatus of claim 1 wherein the fold means comprise a pair of wing mirrors mounted transversely on opposite sides of the X-cube prism and angled to reflect the transverse beams respectively in the direction of the visor eyepieces.

9. Apparatus of claim 1 wherein the visor is mounted at a selected angle relative to the axial ray of the light beams incident thereon to develop a fold angle for said light beams suitable for projecting the light beams toward the eyes of a wearer of the helmet.

10. Apparatus of claim 9 wherein the visor eyepieces comprise thin surface elements laminated respectively to the right and left portions of the visor and having holograms embedded therein.

11. A biocular holographic display device for mounting on a helmet to provide a transparent image display through which an external scene may be viewed, comprising:
   a cathode ray tube having a face plate;
   a combiner in the form of a helmet visor bearing a pair of substantially clear holographic elements through which the user may view an external scene, said holographic elements constituting eyepieces which are displaced by a preselected distance on opposite sides of the midpoint of the visor; and
   means comprising a plurality of optical elements positioned between the cathode ray tube face plate and the visor for bending a beam of light rays from the cathode ray tube face plate, splitting said beam into a pair of like beams, and directing said pair of beams to respective eyepieces on said visor for biocular image viewing by a user, said optical elements comprising a folding prism, a relay lens, an X-cube prism for splitting the beam from the cathode ray tube into a pair of laterally transmitted beams, and a pair of wing mirrors mounted on opposite sides of the X-cube prism for reflecting the split beams toward the combiner;
   and wherein said cathode ray tube, said folding prism, said relay lens, said X-cube prism and said wing mirrors are arranged above the user's eyes and generally in the region of the user's forehead such that each light ray incident on a holographic element from the cathode ray tube and the corresponding light ray diffracted from the holographic element define a generally vertical plane.

12. The device of claim 11 wherein the visor is mounted at an angle with the vertical plane such that a reflection angle in excess of 50° is developed in the axial ray of the projected image.

13. The device of claim 11 wherein the optical elements are oriented such that the relay lens and the folding prism are displaced in a vertical plane from a reference line which is parallel to the axial rays of the split beams as they are projected on the combiner.

14. The device of claim 13 wherein the relay lens comprises a triplet of lens elements including a pair of aspheric lenses arrayed on opposite sides of, and spatially separated from, a meniscus lens.

15. The device of claim 14 wherein the relay lens further includes a spectral filter following said triplet.

16. The device of claim 14 wherein the axis of the relay lens is angularly displaced from the reference line by a predetermined angle.

17. Apparatus of claim 1 wherein said object source device, said X-cube prism, and said light directing means are substantially arranged in a vertical plane.

18. Apparatus of claim 11 wherein said cathode ray tube, said folding prism, said relay lens and said X-cube prism are substantially arranged in a vertical plane.

* * * * *